March 21, 1961  E. B. KNIGHT  2,975,675
SAFETY LIGHT REFLECTOR
Filed Oct. 12, 1956  2 Sheets-Sheet 1

INVENTOR.
Emilee B. Knight
BY Patrick D. Beaver
ATTORNEY.

March 21, 1961
E. B. KNIGHT
2,975,675
SAFETY LIGHT REFLECTOR
Filed Oct. 12, 1956
2 Sheets-Sheet 2
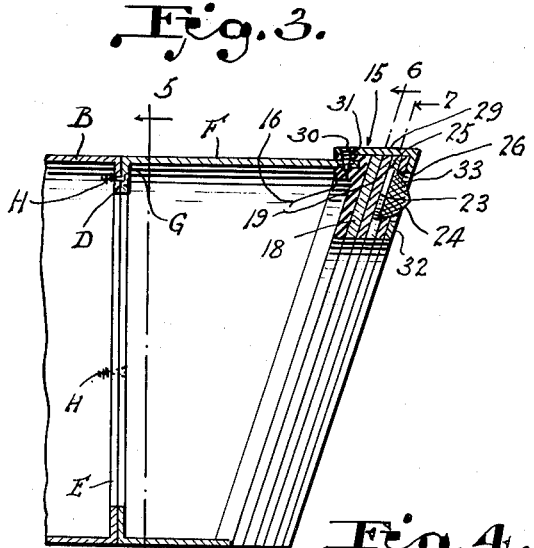
Fig. 3.
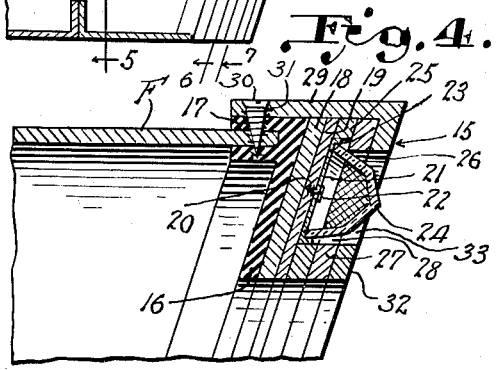
Fig. 4.
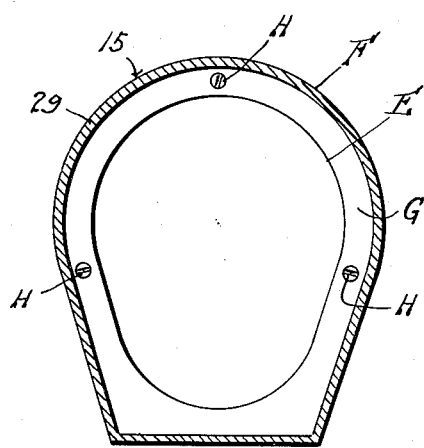
Fig. 5.
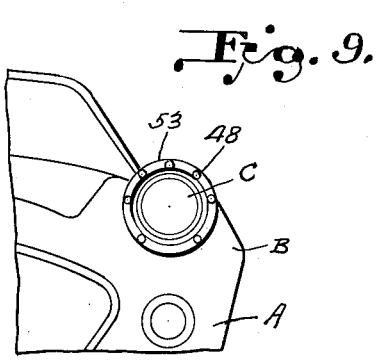
Fig. 9.
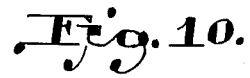
Fig. 10.
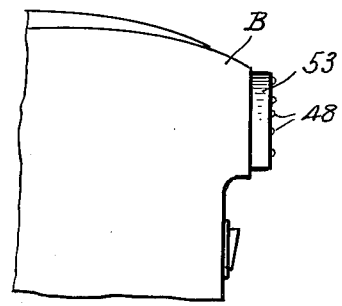
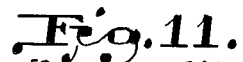
Fig. 11.
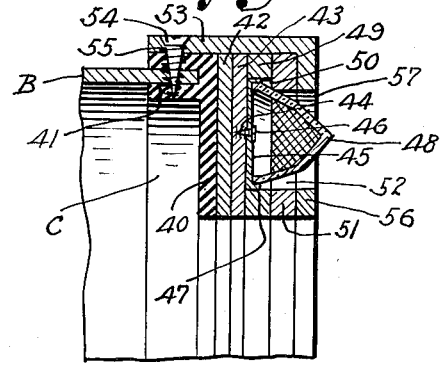
INVENTOR.
Emilee B. Knight
BY
Patrick D. Beavers
ATTORNEY.

United States Patent Office 2,975,675
Patented Mar. 21, 1961

2,975,675
SAFETY LIGHT REFLECTOR

Emilee B. Knight, Virginia, Ill.

Filed Oct. 12, 1956, Ser. No. 615,675

3 Claims. (Cl. 88—81)

This invention relates to safety indicating devices and more particularly to light reflectors that are adapted to be mounted in circumjacent relation to the head lights of automobiles so that the lights from oncoming automobiles will be reflected in the event the headlights have not been turned on, one of the headlights is out or the automobile is parked with no lights.

An object of the invention is, therefore, to provide a frame having reflectors mounted thereon that is to be mounted on an automobile headlight in circumjacent relation to the headlight lens.

It is a known fact that the absence of light on any automobile is a road hazard, involving danger to people in oncoming automobiles and the occupants of the unlighted automobile.

Another object of the invention, therefore, is to provide a device that is a great safety factor for preventing accidents that occur from unlighted automobiles that have stopped on the highway or in the streets.

The device may be mounted in such a way that no alterations of the existing structure need occur.

With the above and other objects and advantages in view, the invention consists of the novel details of construction, arrangement and combination of parts more fully hereinafter described, claimed and illustrated in the accompanying drawings, in which:

Fig. 3 is a fragmentary vertical sectional view of the headlight shown in Fig. 2;

Fig. 4 is an enlarged fragmentary sectional view of Fig. 3;

Fig. 5 is a vertical sectional view on the line 5—5 of Fig. 3;

Fig. 9 is an elevational view of another form of the invention;

Fig. 10 is a side elevational view of Fig. 9; and

Fig. 11 is a fragmentary sectional view of the form shown in Fig. 9.

Figure 1:
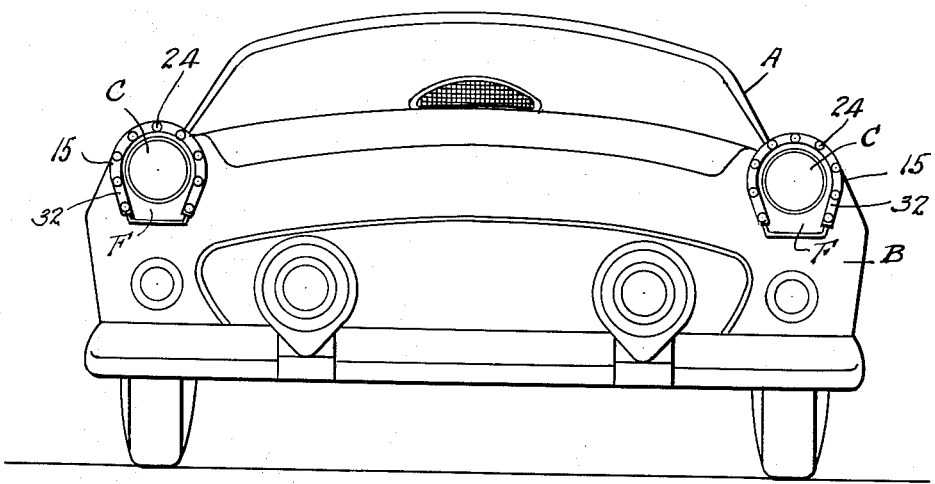
Fig. 1 is a front elevational view of an automobile having one form of the invention mounted thereon in circumjacent relation to the headlight of the automobile.
Figure 6:
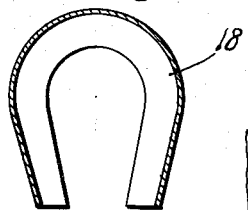
Fig. 6 is a vertical sectional view on the line 6—6 of Fig. 3.
Figure 2:
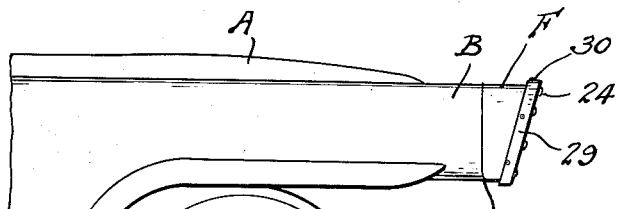
Fig. 2 is a partial side view of Fig. 1.

Referring more in detail to the drawings, wherein like parts are designated by like reference numerals, the reference numeral 15 is used to designate one form of safety light embodying the invention.

In the form of the invention shown in Figs. 1 to 8 inclusive, the reference numeral A is used to indicate an automobile having a fender B and a headlight C. The fender B is provided with an annular flange D which forms an opening E in which the headlight C is mounted. A hood F is also provided with an annular flange G which is connected to the flange D of the fender B by fasteners H. The parts described are well-known parts of a modern automobile and form no part of the present invention.

Figure 7:
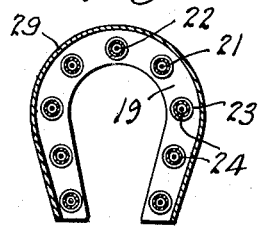
Fig. 7 is a vertical sectional view on the line 7—7 of Fig. 3.
Figure 8:
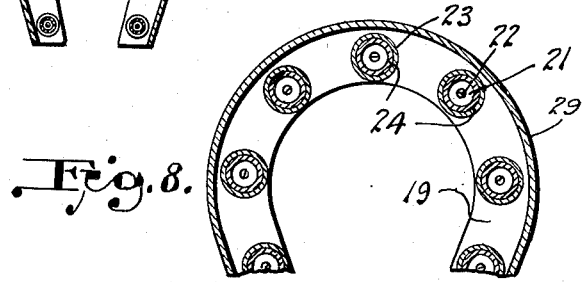
Fig. 8 is an enlarged detailed fragmentary sectional view of Fig. 7.

The safety light 15 comprises a U-shaped rubber mounting member 16, that is provided with an annular groove 17 to receive the outer edge of the hood F. Positioned outwardly of and in contactual relation with the member 16 is a U-shaped gasket 18. Positioned outwardly of and in contactual relation with the gasket 18 is a U-shaped reflector mounting bracket 19. The reflector bracket 19, Figs. 7 and 8, is provided with nine screw holes 20, whereby a disc 21 is connected to each of the screw holes 20 by a screw 22. Each disc 21 is provided with an annular upstanding flange 23 to mount a reflector button 24 in rigid relation to the disc 21.

A U-shaped gasket 25 is provided with nine openings 26 so that when the gasket 25 is positioned forwardly of the bracket 19 in contactual relation therewith the reflector buttons 24 will extend through the openings 26. A third U-shaped gasket 27 is provided with nine openings 28 so that when it is positioned forwardly of and in contactual relation with the gasket 25, the reflector buttons 24 will extend through the openings 28.

A chrome U-shaped metal band or shield 29 is positioned over and in contact with the peripheral edges of the member 16, gasket 18, bracket 19, and gaskets 25 and 27, and fastening means 30 extend through openings 31 in the shield 29 to pass through the member 16 and the edge of the hood F so that the safety light 15 is rigidly secured to the hood F. The shield 29 is provided with an inwardly extending flange 32. The flange 32 is provided with nine openings 33 and with the flange 32 in contactual relation with the gasket 27 the reflector buttons 24 will extend through the openings 33.

This form of the invention is especially adapted for use with modern automobiles, while the form of the invention shown in Figs. 9 to 11 inclusive are adapted for use in old model automobiles.

In Figs. 9 to 11 the automobile A is provided with a fender B and such members do not form a part of the invention. The fender B has a headlight C mounted therein and a circular rubber mounting member 40 is mounted on the headlight C in circumjacent relation thereto. The member 40 is provided with an annular circular groove 41 which receives the forward edge of the fender B. Positioned forwardly of and in contactual relation with the member 40 is a circular gasket 42. Positioned forwardly of and in contactual relation with the gasket 42 is a circular reflector mounting bracket 43 that is provided with seven screw holes 44 to form an inverted U-shaped row of screw holes and a disc 45 is connected to each of the screw holes 44 by a screw 46. Each disc 45 is provided with an annular upstanding flange 47 to mount a reflector button 48 in rigid relation to the disc 45.

A circular gasket 49 is provided with seven openings 50 so that the gasket 49 is positioned forwardly of the bracket 43 in contactual relation therewith, the reflector buttons 48 will extend through the openings 50. A third circular gasket 51 is provided with seven openings 52 so that when it is positioned forwardly of and in contactual relation with the gasket 51 the reflector buttons 48 will extend through the openings 52.

A circular chrome metal band or shield 53 is positioned over and in contactual relation with the peripheral edges of the member 40, gasket 42, bracket 43, and gaskets 49 and 51, respectively. Fastening means 54 extend through openings 55 in the shields 53 to pass through the member 40 and the edge of the fender B so that the shield 53 is rigidly secured to the fender B. The shield 53 is provided with an inwardly extending flange 56 and the flange 56 is provided with seven openings 59 so that with the flange 56 in contactual relation with the gasket 51, the reflector buttons 48 will extend through the openings 57.

In both forms of the invention the flange on the shield secured to the automobile A will retain all the members of the safety light in rigid contactual relation with each other.

The safety light embodying the invention is ornamental and attractive in appearance, does not decrease the efficiency of the headlights of an automobile, but rather increases it, and it is believed that the construction and manner of mounting of the invention will be apparent to those skilled in the art, it is also to be understood that changes in the minor details of construction, arrangement and combination of parts may be resorted to provided they will fall within the spirit of the invention and the scope of the appended claims.

Having thus described the invention what is claimed as new and desired to be secured by Letters Patent is:

1. A supplemental reflecting structure for attachment to the hood of an automobile headlight comprising a resilient mounting member having an annular groove therein to receive the outer edge of the hood, a first gasket member abutting said mounting member, a reflector mounting bracket abutting said gasket, a plurality of discs secured to said bracket in equi-spaced relation to each other, a reflector button mounted on each disc, a second gasket having openings therein to receive said buttons abutting said bracket, a third gasket member having openings therein to receive said buttons abutting said second gasket, and a frame having openings therein to receive said buttons abutting said third gasket and having a flange thereon that extends over all of said gaskets and said bracket.

2. A supplemental reflecting structure as in claim 1, wherein all of said gaskets, bracket and frame are of U-shape.

3. A supplemental reflecting structure as in claim 1, wherein all of said gaskets, bracket and frame are of circular formation.

References Cited in the file of this patent

UNITED STATES PATENTS

| | | |
|---|---|---|
| 1,256,445 | Dodds | Feb. 12, 1918 |
| 1,751,070 | Boots et al. | Mar. 18, 1930 |
| 1,758,809 | Shoemaker | May 13, 1930 |
| 1,832,605 | Zallio | Nov. 17, 1931 |
| 1,943,440 | Horni | Jan. 16, 1934 |
| 1,990,223 | Cockran | Feb. 5, 1935 |
| 2,002,015 | Kosten et al. | May 21, 1935 |
| 2,082,658 | Sauer | June 1, 1937 |
| 2,093,907 | Clark | Sept. 21, 1937 |
| 2,226,597 | Thomas | Dec. 31, 1940 |
| 2,304,861 | Thee | Dec. 15, 1942 |
| 2,472,850 | Plant | June 14, 1949 |